Aug. 26, 1969   H. L. REINSMA ET AL   3,463,560
SELF-CONTAINED, SEALED AND LUBRICATED HINGE JOINT
Filed Oct. 23, 1967   2 Sheets-Sheet 2

INVENTORS
HAROLD L. REINSMA
FLOYD S. DADDS
LOGAN J. JOHNSON
ATTORNEYS 3,463,560
SELF-CONTAINED, SEALED AND LUBRICATED
HINGE JOINT
Harold L. Reinsma and Floyd S. Dadds, Peoria, and
Logan J. Johnson, East Peoria, Ill., assignors to
Caterpillar Tractor Co., Peoria, Ill., a corporation
of California
Filed Oct. 23, 1967, Ser. No. 677,349
Int. Cl. B62d 55/08, 55/20
U.S. Cl. 305—11                           8 Claims

ABSTRACT OF THE DISCLOSURE

A hinge construction for coupling two members which pivot relative to each other is formed as a preassembled, prelubricated, sealed tubular cartridge which transpierces the pivotable members and which may be installed and removed as a unit. The cartridge has a hinge pin and coaxial sleeves which define precision bearing surfaces with seals being provided between sleeves, together with means for maintaining optimum preloads on the seals in the presence of variable forces at the joint.

Background of the invention

This invention relates to pivot joint constructions and more particularly to a durable precision hinge joint cartridge which may be readily installed, removed and replaced as a unit.

Members which must pivot relative to each other are frequently joined by receiving an end of one member in a slot on the other member and transpiercing the ends of both members with a hinge pin. While this simple construction is adequate for many purposes, there are many other instances where greater precision and greater durability are needed than can be provided by such a joint. Where repeated flexing occurs, a simple joint of this kind is subject to rapid wear and consequent looseness particularly if the joint is subjected to forces which have an axial component relative to the pivot axis. Frequent lubrication is necessary and such a joint is readily contaminated by dirt or other abrasive foreign matter. Accordingly, a variety of more complex hinge joint constructions have been developed in which internal bearing surfaces are protected by seals which both retain lubricating fluids and exclude foreign matter.

Heretofore, these sealed precision hinge joints have involved a number of parts which must be separately assembled at the joint during installation, and separately removed when repair or replacement is necessary. In many instances, the time, effort, and skill required for these operations is a serious problem. Where these operations must be performed in the field, there is a serious risk of contamination from dust or other abrasive material. Further, prior hinge joints of this general class have been subject to uneven loading of the seals, particularly where large thrust forces are encountered at the joints. As a consequence, wearing is accelerated, frequent lubrication and other servicing is needed and the general durability of the joint is adversely affected.

Summary of the invention

The present invention minimizes the above described problems in a joint construction of the type having internal precision bearing surfaces protected by seals. The joint construction is a preassembled cartridge which may be installed as a unit and may be quickly and simply removed and replaced with a similar unit when necessary. The joint construction is permanently prelubricated and is arranged to maintain an optimum load force on the seals to minimize the adverse effects of variable stresses so that servicing is not required during the life of the joint.

Accordingly, it is an object of this invention to provide a durable precision unitary pivot joint construction which is more convenient to install and remove and which requires less maintenance.

The invention will best be understood by reference to the following description of representative embodiments in conjunction with the accompanying drawings.

Brief description of the drawings

In the accompanying drawings.

Description of the preferred embodiments

Figure 1:
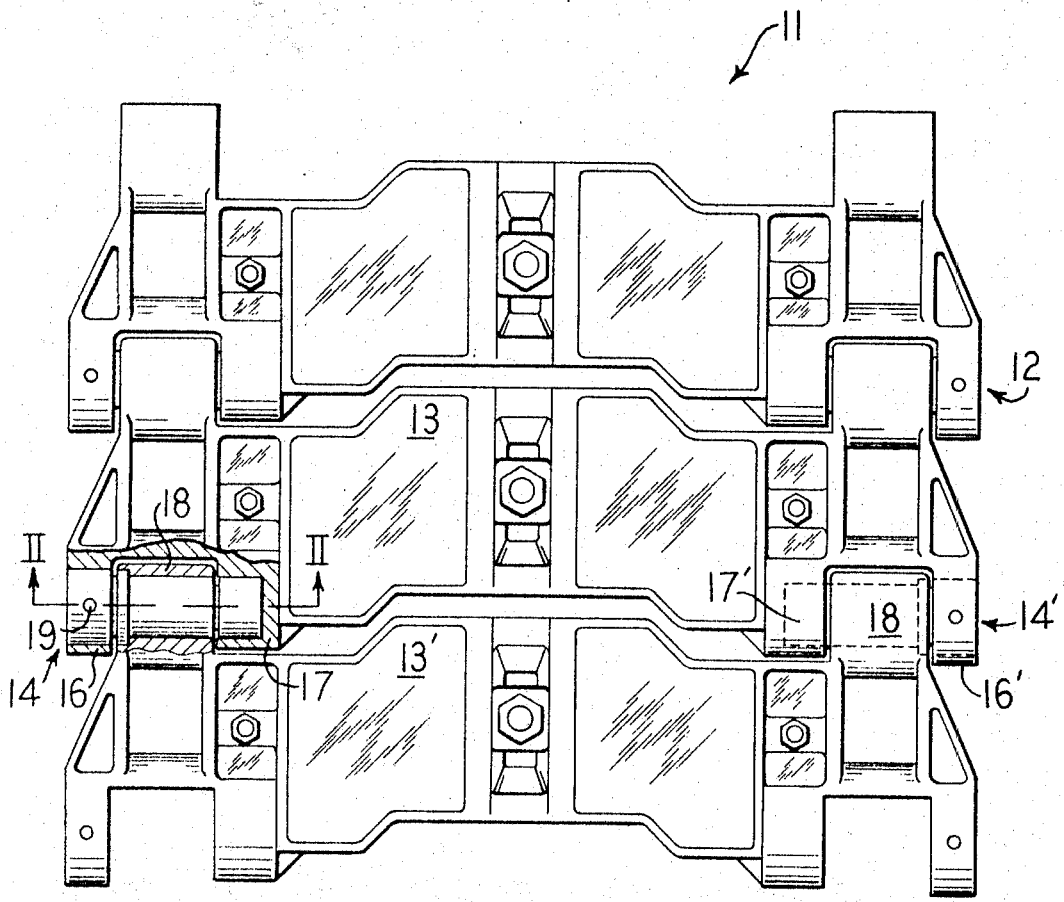
FIGURE 1 is a plan view of a portion of the track chain of a crawler vehicle in which the present invention is utilized for coupling successive links of the track chain.

Referring now to FIGURE 1 of the drawing, the track chain 11 of a crawler vehicle such as a military tank or a tractor is typical of structures requiring hinge joints between members which must pivot relative to each other. The particular track chain 11 illustrated in FIGURE 1 is of the type used on military vehicles and which is adapted for operation at relatively high speeds. The joints 12 between successive links 13 of the track chain may be subjected to very severe and sudden forces which may be directed axially or obliquely relative to the pivot axis of the joint. Such forces arise from various causes such as passage over irregular terrain or sloping terrain, rapid acceleration or deceleration, or from turning of the vehicle. It is important that the hinge coupling 12 be durable, precise and that maintenance requirements be minimized notwithstanding harsh operating conditions. The present invention provides a preassembled, unitary hinge joint cartridge 14 which meets these requirements and in addition is very simply and quickly installed, or removed and replaced when necessary.

In a track chain 11 of this general type, the coupling of adjacent links 13 is provided for by forming a pair of spaced apart, coaxial, annular bosses 16 and 17 at one corner of each link, the boss 17 being the innermost one. A similar pair of annular bosses 16' and 17' project from the corner at the opposite end of the same edge of the link 13. The adjacent link 13' is provided with a single annular boss 18 at each corner which fits between one of the pairs of bosses 16 and 17 of the preceding link in coaxial relationship therewith. One of the preassembled hinge joint cartridges 14 is inserted into each set of annular link bosses 16, 17 and 18 to form a pivotable coupling therebetween and is retained in position by a single dowel pin 19 which extends radially in the outermost boss 16 and into the cartridge 14.

As will hereinafter be described in more detail, each cartridge 14 is a preassembled unit and thus may be very simply and conveniently installed by simply inserting the cartridge into the bosses 16, 17 and 18 and emplacing the dowel pin 19. The cartridge 14 may be quickly and simply removed by reversing these operations when replacement of the cartridge or disassembly of the track chain is necessary.

Figure 2:
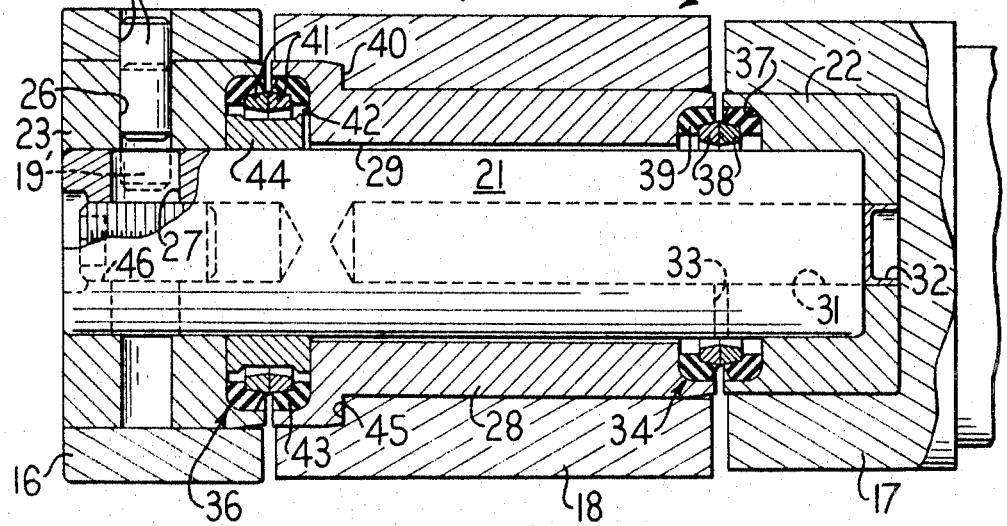
FIGURE 2 is an axial section view showing the internal construction of one of the cartridge type hinge joints used to couple successive links in the track chain of FIGURE 1.

Referring now to FIGURE 2, the preassembled hinge joint cartridge 14 has a cylindrical hinge pin 21 with an annular inner end cap sleeve 22 press fitted thereon in coaxial relationship therewith. End cap 22 fits between the inner end of the pin 21 and track link boss 17 when the cartridge is installed. An outer end sleeve 23 is lightly press fitted on the opposite end of the hinge pin 21 and fits within the outermost track link boss 16 when the cartridge is installed. The light press fitting of sleeve 23 on hinge pin 21 is for the purpose of securing all elements of the cartridge 14 together prior to installation in the track chain to form the desired unitary construction. Once installed, cartridge 14 is more strongly held together and is held in place by the previously described dowel pin 19 which is inserted into aligned radial passages 24 and 26 in boss 16 and sleeve 23, respectively.

To facilitate removal of the cartridge 14, an additional radial passage 27 extends through hinge pin 21 in alignment with passages 24 and 26 and dowel pin 19 is made sufficiently short that it may be driven in towards the hinge pin, to the position illustrated by dashed lines 19' in FIGURE 2, at which it no longer engages boss 16.

To provide the bearing surfaces between which rotational movement can take place, a center sleeve 28 is disposed coaxially on the pin between sleeve 23 and end cap 22. When the cartridge 14 has been installed, center sleeve 28 fits tightly within the central tracklink boss 18, but a small clearance space 29 exists between the center sleeve and hinge pin 21, the clearance space between the bearing surfaces being shown in FIGURE 2 as somewhat greater than would normally be used in order to clearly illustrate the structure.

To provide lubrication for the bearing surfaces of center sleeve 28 and hinge pin 21, an axial passage 31 is formed in the central portion and inner end of hinge pin 21 and is closed by a plug 32 secured in end cap 22. During manufacture of the cartridge 14, passage 31 is filled with a suitable lubricant such as oil which constitutes a permanent supply for the hinge joint. To admit the lubricant to clearance space 29, a passage 33 extends radially within pin 21.

To retain the lubrication within the cartridge 14 and to exclude foreign matter, a first seal assembly 34 is disposed between end cap 22 and center sleeve 28 and a second seal assembly 36 is situated between the center sleeve and outer sleeve 23. To receive the several elements of inner seal 34, annular cavities 37 are formed in the facing ends of end cap 22 and center sleeve 28 adjacent the hinge pin 21. Seal assembly 34 is of the metal face seal type and thus includes two abutted metal rings 38 and resilient backing rings 39 disposed between the metal rings and the surfaces of cavities 37. The abutting flat surfaces of the two metal rings 38 may undergo relative angular motion when necessary, but are effective to prevent the escape of lubricating oil therebetween and to prevent the entrance of foreign material.

Seal assembly 36 is of a similar type and thus includes a pair of metal face seals 41 which are abutted and situated within annular cavities 42 in the adjacent ends of end sleeve 23 and center sleeve 28 with resilient backing rings 43 being situated between the metal rings and the cavity surfaces. The rings 41 and 43 of seal assembly 36 are of greater diameter than the corresponding elements of the inner seal assembly 34 so that an accurately machined annular thrust ring 44 may be accommodated within the cavities 42 adjacent hinge pin 21.

Referring again to FIGURE 1 in conjunction with FIGURE 2, the use of a single thrust ring 44 in the cartridge 14 as a stop means prevents axial shifting of components in both directions where, as in the present instance, two of the cartridges are employed to join the pivotable members such as the track links 13 and 13' in this example. This is provided for by forming a shoulder 40 on center sleeve 28 which seats in an annular recess 45 at the outer end of boss 18. Since the bosses 18 at the opposite ends of links 13' are rigidly fixed relative to each other, no inward motion of the center sleeve 28 of either cartridge is possible. Outward motion, which might also affect the seal loading, is blocked by the single thrust ring 44 in each cartridge.

Accordingly, the above described structure maintains a predetermined optimum load force on the face seal rings 38 and 41 of seal assemblies 34 and 36, respectively, irrespective of axial loading forces on the cartridge 14 or relative rotation of the members theerof. The preloading of the seal assemblies 34 and 36 is established during manufacture of the cartridge 14 and is dependent upon the axial dimension of the thrust ring 44. By providing for accurate finishing of the end surfaces of the thrust ring 44, the optimum seal loading is assured.

To facilitate withdrawal of the cartridge 14 from the track links when replacement is needed, a threaded axial bore 46 is provided in the outer end of hinge pin 21. Thus, by engaging an eyebolt or the like in bore 46 and making use of an hydraulic jack or other pulling implement, the cartridge may very readily be removed.

Figure 3:
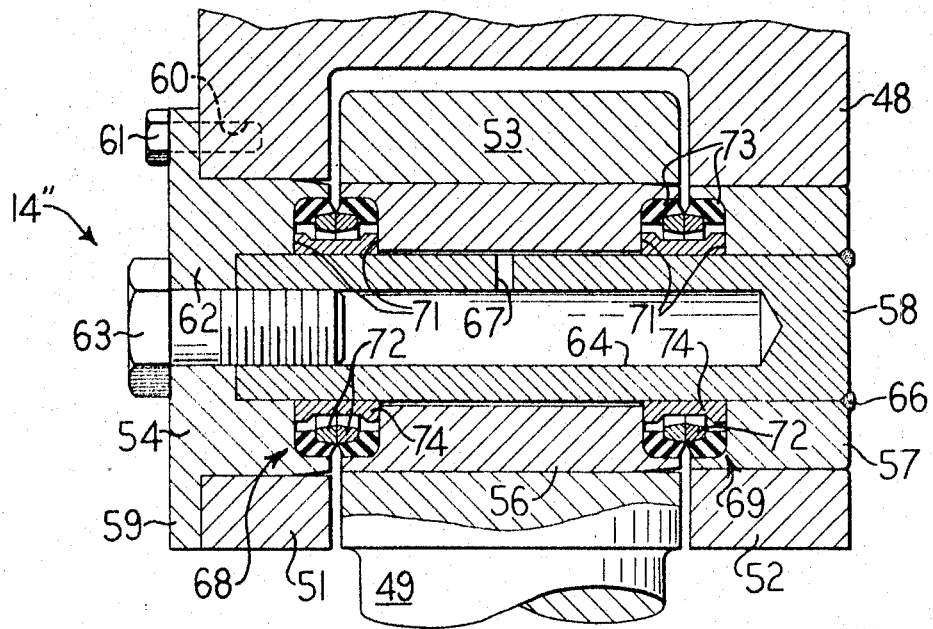
FIGURE 3 is a section view taken along the pivot axis of a modified hinge joint cartridge utilized to couple pivotable arms of apparatus such as the linkage which manipulates the load carrying bucket of an earth moving vehicle.

It should be understood that the replaceable unitary hinge joint cartridge of the present invention may be utilized to couple track chain links of other than the military type illustrated in FIGURE 1 and further may be utilized to form a pivot joint in other types of equipment. Referring now to FIGURE 3, a hinge joint cartridge 14″ of this general type is shown as used to form a pivot connection between two links 48 and 49 which may be successive sections of an articulated linkage which manipulates the load carrying bucket of an earthmoving vehicle of the type disclosed in U.S. Patent No. 3,211,310, issued Oct. 12, 1965, for "Trip Mechanism for Automatically Positioning Vehicle Loaders." As in the previous instance, the joint provided by cartridge 14″ is more durable, more maintenance free and more readily installed and replaced while being capable of withstanding very heavy load forces.

To receive the hinge joint cartridge 14″, one of the links 48 is formed with a yoke at the end comprised of two spaced apart, coaxial annular boss projections 51 and 52. A single annular boss projection 53 at the end of the other link 49 is received between bosses 51 and 52 in coaxial relationship therewith. Cartridge 14″ is transpierced through each of the bosses 51, 52 and 53 to form the coupling between links 48 and 49.

The preassembled unitary hinge joint cartridge 14″ in this embodiment has a modified construction in which three sleeves, including a first end sleeve 54, center sleeve 56 and second end sleeve 57 are again disposed coaxially on a hinge pin 58. When the cartridge is installed, first end sleeve 54 is situated within boss 51, center sleeve 56 is within boss 53 and second end sleeve 57 is within boss 52 in non-rotating engagement therewith in each instance. However, unlike the previous embodiment, one of the end sleeves 54 has a flange 59 which overlaps the end of the adjacent boss 51 and which is transpierced by a bolt 61 which engages in a threaded bore 60 in the boss to secure the cartridge assembly 14″ in place.

First end cap 54 also has a lip 62 which extends radially inward adjacent an end of hinge pin 58 and abuts thereagainst. The assembly is secured together by a bolt 63 which extends through the first end cap 54 and engages in a threaded axial bore 64 within the hinge pin 58. Bolt 63 extends into bore 64 for only a short portion of the total length thereof so that the remainder of the bore may be utilized for retaining lubricating fluid. It should be noted that this requires that the cartridge 14″ be assembled while in an upright position in order to retain the lubricating fluid in bore 64 while the end cap 54 and bolt 63 are being applied thereto.

The second end cap 57 is fixedly secured to the hinge pin 58 by a weld 66 or other means and the first end cap 54 is secured to both the hinge pin 58 and boss 51 by bolts 63 and 61 as previously described. Accordingly, there is no relative angular movement between any of these members. The bearing surfaces about which angular motion occurs are those between pin 58 and the center sleeve 56. Accordingly, suitable clearance is provided between these surfaces and lubricating fluid is transmitted thereto by a radial passage 67 in hinge pin 58 communicating with the axial bore 64 thereof.

To seal the lubricating fluid within the cartridge 14″ and to exclude contamination, seal assemblies 68 and 69 are disposed at opposite ends of center sleeve 56. To receive the seals, annular cavities 71 are situated at each end of the center sleeve 56 and in the adjacent end surfaces of end sleeves 54 and 57. Each seal assembly 68 and 69 is comprised of a pair of abutted metal face rings 72 and a pair of resilient backing rings 73 which are compressed between the metal rings and the walls of cavities 71.

Inasmuch as the type of coupling illustrated in FIGURE 3 utilizes only a single one of the preassembled hinge joint cartridges 14″ a precision thrust ring 74 is required at both seal assemblies 68 and 69 to establish and maintain an optimum preload on the sealing rings 72. Each such thrust ring 74 is an annular element disposed coaxially about the hinge pin 58 within cavities 71 and has accurately machined end surfaces so that the optimum axial spacing of sleeves 54, 56 and 57 is established when bolt 63 is tightened. Once the cartridge 14″ has been assembled in this manner, no significant axial movement of any of the sleeves 54, 56, 57 relative to each other or to the hinge pin 58 is possible.

While the invention has been described with respect to certain exemplary embodiments, it will be apparent that many modifications are possible.

What is claimed is:

1. In combination with a first link having spaced apart first and second boss projections with aligned transverse bores therethrough and a second link having a third boss projection received between said boss projections of said first link and having a third bore in alignment with said bores of said first link, a preassembled unitary hinge joint cartridge extending through each of said bores to couple said links in a pivotable manner, said cartridge comprising:
   a hinge pin extending along the common axis of said bores and having a smooth cylindrical bearing surface;
   a center sleeve disposed coaxially on the central portion of said hinge pin within said third bore, said center sleeve having a smooth cylindrical bearing surface from end to end facing said bearing surface of said hinge pin and being rotatable relative thereto and being stationary relative to said second link;
   a first end sleeve disposed coaxially on a first end of said hinge pin within a first of said bores of said first link and being fixed against rotation relative to said hinge pin;
   a second end sleeve disposed coaxially on the opposite second end of said hinge pin within the second of said bores of said first link and being fixed against rotation relative to said hinge pin;
   disengageable means fastening said first end sleeve to said first boss projection of said first link;
   a pair of annular seal assemblies disposed coaxially about said hinge pin each being disposed between a separate end of said center sleeve and the adjacent one of said end sleeves for retaining lubricating fluid at said bearing surfaces; and
   stop means between the end of said center sleeve and at least one of said outer sleeves fixing said center sleeve against axial movement relative to said hinge pin and said seal assemblies whereby a constant predetermined preload force on said seals is maintained during pivoting of said links.

2. The combination defined in claim 1 wherein said means fixing said center sleeve against axial movement relative to said hinge pin and said seal assemblies comprises an annular thrust ring disposed coaxially with respect to said hinge pin between said center sleeve and at least one of said end sleeves and having precision finished end surfaces abutting precision finished end surfaces of said center sleeve and said one of said end sleeves.

3. The combination defined in claim 1 wherein said hinge pin has a threaded axial bore at one end thereof for facilitating withdrawal of said unitary cartridge from said bores of said links without disassembling said cartridge.

4. The combination defined in claim 1 wherein said first and second links are adjacent component links of a crawler vehicle track chain and wherein said first link has two pairs of said spaced apart first and second boss projections and said second link has a pair of said third boss projections each being received between a separate one of said pairs of boss projections of said first link and wherein two of said preassembled hinge joint cartridges couple said first and second links, a first of said cartridges being disposed within one set of said first and second and third boss projections and the other of said cartridges being coaxial therewith and being disposed within the other set thereof.

5. The combination defined in claim 4 wherein the means fixing said center sleeve of each of said cartridges against axial movement relative to the associated hinge pin comprises a shoulder formed on said center sleeve and abutting an annular recess formed in the associated one of said third boss projections, and an annular thrust ring disposed coaxially about said hinge pin in each of said cartridges between said center sleeve and said first end sleeve thereof.

6. The combination defined in claim 1 wherein said first end sleeve has a flange abutting an end surface of said first boss projection and wherein said disengageable means comprises a threaded bolt transpierced through said flange and engaged in said first boss projection.

7. The combination defined in claim 1 wherein said hinge pin has an axial bore within at least a portion thereof and wherein said first end sleeve is secured to said hinge pin by a threaded bolt transpierced through said first end sleeve and engaged in said bore, said bolt being engaged only in a portion of said bore whereby the remaining portion of said bore may contain a lubricant supply.

8. The combination defined in claim 1 wherein said means fixing said center sleeve against axial movement relative to said hinge pin comprises a pair of annular thrust rings having precision finished end surfaces, each of said thrust rings being disposed coaxially with respect to said hinge pins between said center sleeve and a separate one of said end sleeves.

References Cited

UNITED STATES PATENTS

| 1,975,107 | 10/1934 | Knox | 305—58 X |
| 2,481,727 | 9/1949 | Deffenbaugh | 305—14 |
| 2,536,064 | 1/1951 | Knox | 305—59 |
| 3,168,354 | 2/1965 | Gibson | 305—14 |
| 3,092,423 | 6/1963 | Speidel | 74—254 X |
| 3,279,868 | 10/1966 | Jacob | 305—59 |

RICHARD J. JOHNSON, Primary Examiner

U.S. Cl. X.R.

74—254; 305—14, 59